Oct. 21, 1930.    E. S. HALSEY    1,779,066
TEMPERATURE INDICATOR
Filed Oct. 28, 1929
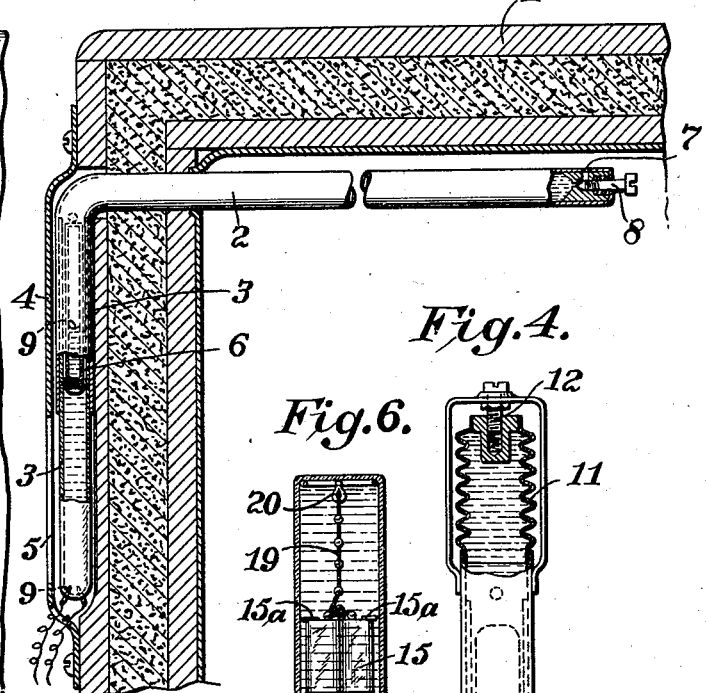
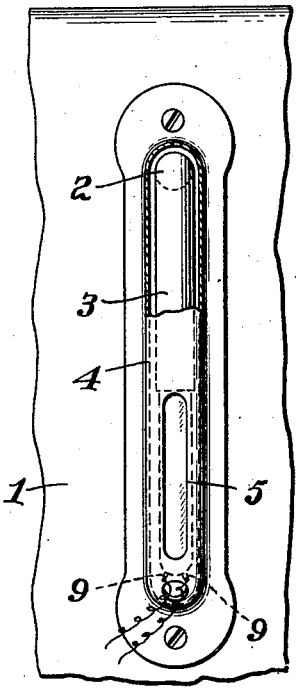
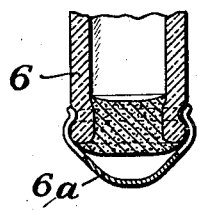
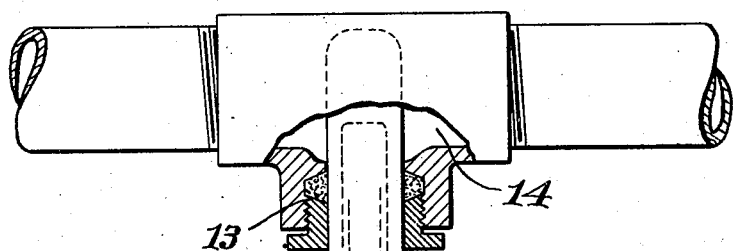
Inventor:
Edward S. Halsey,
By Spear Middleton
Donaldson & Hall
Attys.

Patented Oct. 21, 1930

1,779,066

UNITED STATES PATENT OFFICE

EDWARD S. HALSEY, OF WASHINGTON, DISTRICT OF COLUMBIA

TEMPERATURE INDICATOR

Application filed October 28, 1929. Serial No. 402,981.

The invention concerns temperature indicators for use in various situations or to serve as signal means when a prescribed critical temperature has been reached.

The invention is shown in the accompanying drawings in which:

Figure 1 illustrates in section a portion of a refrigerator wall with my invention in place thereon.

Fig. 2 is a front view of the indicator.

Fig. 3 is a view of a detail.

Fig. 4 is a view partly in section of another form of the invention.

Fig. 5 is a view partly in section of the application of the invention to a hot water heating system or the like.

Fig. 6 shows in section the application of the invention to another situation.

Referring to Figures 1 and 2 I have indicated at 1 the wall of a refrigerator, to which the invention is applied. This consists in this particular form of a tube 2 projecting into the refrigerating chamber and having a vertically extending portion 3 outside the wall of the chamber, any suitable protecting casing or shield being used as at 4, having an opening 5 through which the tube 3 may be viewed. The vertical portion of the tube has a float 6 therein closed at the top and having communication at its lower end with the interior of the tube 3. This tube contains a liquid which is introduced through the port 7 at the end of the portion 2, said port being controlled by a screw plug or valve 8 which is set in closed position after the liquid is introduced under the desired pressure. This pressure is optional, but as an instance, I mention a pressure of five pounds to which the contents of the tube 2, 3 may be subjected. The liquid fills the outer tube 2, 3 and extends part way up into the float, say as an example to the point 9, when the device is charged at a certain temperature below that at which it is intended to operate as an indicator.

The tube 2, 3 it will be noticed is closed to atmosphere and the device operates without regard to barometric pressures and solely by and when the temperature of the chamber or space in which the device is located rises to a prescribed degree. The float 6 will then fall to its lowest position where it will be visible through the sight opening 5 and thus indicate that the critical temperature of the chamber or space has been reached.

The fall of the indicator 6 when this critical temperature has been reached is due to the expansion of the liquid contained in the tube 2, 3, which results in its rise into indicator float through its open lower end, the gas or air bubble at the upper end of the said indicator yielding and being compressed by the rise of the liquid thereinto.

This action results in altering the buoyancy of the indicator float 6 so that at the critical temperature for which the device is built and calibrated the float will descend all the way to the bottom of the tube 3 where it will be visible through the opening 5. The float may be colored as may be desired, such as ruby red, to be readily visible, or be opaque so as to screen a colored plaque back of it.

As above stated the float is open at its lower end to the access of the liquid thereinto. This lower end may be freely open or a plug of porous material such for instance as plaster of Paris may be used in the lower end of the float. This will allow access of the liquid to the interior of the float, by a capillary action, and will permit the variations in the pressure of the liquid in tube 2, 3, due to expansion and contraction under variations of temperature to compress the gas within the float or relieve it of more or less pressure. The plaster of Paris has a high capillary action as regards liquids but a feeble capillary action as regards air or gas and hence with the plug in place the device may be shipped with safety and without loss of gas from the float even though its vertical position during shipment may not be maintained.

Any expansible liquid may be employed, such, for instance, as tetra-chloride of carbon or water, though the first mentioned liquid will give a greatly enhanced effect.

It will be noticed that my invention operates under a closed pressure system.

The interior of the tube 2, 3 has no communication with atmosphere and the device is affected only by temperature changes and not by changes in pressure of the atmosphere.

Initially, or when the device is being completed, the pressure within the tube 2, 3 and upon the liquid is such that said liquid will rise within the float, compressing the gas or air therein to obtain a prescribed buoyancy thereof and when under a rise in temperature to a prescribed critical point, the liquid rises in the float, due to expansion, and the compression of the gas or air takes place, the float will then sink and indicate that the critical temperature has been reached.

The float is preferably weighted at its lower end to keep it vertical and reduce friction against the guiding walls. The float may operate an audible signal, for which purpose it may be provided at its lower end with a metallic cap 6a serving as a circuit closer in connection with contacts 9 at the bottom of the tube 3. These contacts may be metallic points or globules of mercury as indicated at 10, Fig. 4.

In Fig. 4 I show a form of apparatus adapted for various situations, such as rooms of dwellings. The liquid container tube 3a may be combined with a sylphon section 11 adjustable by a screw 12 by which the pressure on the fluid may be altered to adjust the device to operate at various temperatures as may be desired.

In Fig. 5 the device is shown applied to a hot water or steam heating system. Here a tube 3b is employed, extending through a stuffing box 13 into the pipe 14 to be subject to the heat of the fluid therein.

In Fig. 6 I show a float of a different form from that described above, in that it consists of a closed hollow body 15, the sides of which are flexible, such as thin metal walls, which, under expansion of the liquid within the tube 3c, will flex inwardly and compress the gas or air within the hollow body and thus change its buoyancy with an effect like that before described, i. e., that the float will sink under a rise of temperature and will rise under a fall of temperature.

This device may be applied to transformer units or in other combinations. Guiding pins are shown at 15a and a weight at 15b.

In the present instance the member 16 is a part of a transformer or other apparatus which is to be safeguarded against a rise of temperature above a critical point.

The tube 3c is made in two parts, the upper part being of glass and the lower part 3d of metal. They are threaded together at 17 and there is packing 18 about this joint which serves also as a part of a stuffing box where the tube passes through the cover or other part of the apparatus.

This serves as packing against the weather. There is also packing at 18a between the lower end of tube 3c and an internal shoulder on tube 3d.

In this form the float is cubical, having six flexible sides. For certain purposes, such as the safeguarding of transformers, it may be desirable to have the indicating float descend by several progressive steps or stages, instead of all at once. For this purpose, I may use means for variably applying weight to the float. This may consist of a chain 19 of metal attached at its upper end at 20 to the tube and with its lower end resting upon the float. When the float is up, several links of the chain will rest thereon and impose their weight upon the float. As the float goes down, it will be relieved of the weight of one link after the other, which one by one become consecutively supported by the chain which is suspended from above. The movement of the float either up or down will therefore progress in hesitating steps, as its burden of weight is altered. Upon a fall of temperature, the float will rise, owing to contraction of the liquid within the tube 3c, and the consequent release of pressure from the compressible float so that the float will expand and increase in buoyancy. As it rises it picks up one chain link after the other, so that its upward movement is progressively retarded at definite intervals, indicative of the progressive variation of temperature that is taking place in the liquid.

The pressure upon the charge of liquid in all forms may be above atmosphere or below, but in charging the device it will be more convenient to do so at a pressure above that of the atmosphere.

In all the forms described the float starts to fall at a critical temperature and then, with the exception of the modification shown by Fig. 6, performs its complete downward stroke. The float is always completely submerged. It will be understood that while I have shown certain features in only one figure of the drawing, they are to be regarded as associated with the forms shown in the other figures, when susceptible of use therein. Thus I describe the tube in Fig. 6 as composed of glass and metal. This feature may be used in the other forms if desired.

Further the sylphon with its adjustment may be used in the other forms, or the progressive weighting of the float may be used in the other forms as well as in Fig. 6, and the chain link may be substituted by a string of balls or other weights.

Any suitable means for regulating or adjusting the required actuating pressure of the liquid charge to secure the desired operating temperature, either at the time of charging, or subsequently, may be employed. I have shown two practical means of securing this adjustment, i. e., the flexing of a portion of the container wall by screw pressure, as shown by Fig. 4, or as shown by Fig. 1, a small duct 7 with a sealing valve 8 may be arranged to conveniently connect with a suitable external source of variable liquid pressure, so adapted that when the desired operating temperature and pressure is reached, said valve is permanently sealed by tightly closing it.

Reverting to Fig. 1, the section 2 of the tube is of metal, while the section 3 is of glass suitably cemented within the metal tube. The metal tube acts as a heat conductor and the glass tube gives visibility to the indicator.

I claim:

1. An automatic variable buoyancy indicator comprising a casing, a liquid filling said casing and expansible at a prescribed degree of temperature, and a float adapted to rise and sink in said liquid and having within it an elastic element responsive to variations in pressure of said liquid due to changes in temperature, the wall of said enclosing casing being non-yielding to internal and external pressures, said float sinking when a prescribed temperature is reached due to the expansion of said liquid, and the non-yielding character of the wall of the casing.

2. An indicator according to claim 1 in which the interior of the float is in communication with the tube for the accession of the liquid, the said communication being by way of a body having capacity for capillary action in connection with the liquid but substantially air or gas tight, substantially as described.

3. An indicator according to claim 1 in which the tube containing the liquid is provided with means for varying the pressure on said liquid, said means consisting of an adjusting member capable of remaining set, when once adjusted, for the automatic operation of the device when a prescribed temperature is reached.

4. An indicator according to claim 1 in which the liquid containing tube has a sylphon extension with means for adjusting the same.

5. An indicator according to claim 1 in which there is associated with the float means for progressively removing weight therefrom as it sinks and progressively imposes weight thereon as it rises, substantially as described.

6. An indicator according to claim 1 in which a flexible weight member is suspended above the float, progressively more and more of said weight being removed from the float as it sinks and progressively more and more of said weight being imposed on said float as it rises, substantially as described.

7. A temperature indicator comprising a tube composed of a metallic temperature conducting section to extend within the space, the temperature of which is to be indicated, a glass section attached to the metallic section and in position to be visible, said tube containing liquid and closed to atmosphere, and a hollow float within the glass section subject to compression and expansion respectively by expansion and contraction of the liquid under a rise or fall of temperature, the wall of said tube being rigid throughout substantially as described.

8. A temperature indicator comprising a tube containing a liquid and closed to atmosphere and a hollow float in the liquid whose buoyancy changes under the contraction and expansion of the liquid, due to the existence of prescribed temperatures.

9. Apparatus acccording to claim 1 in which adjusting means are provided for varying the capacity of the container, substantially as described.

10. Apparatus according to claim 1 in which the float is closed and has a flexible wall or walls of non-porous material.

In testimony whereof I affix my signature.

EDWARD S. HALSEY.